US005571254A

United States Patent [19]

Saeki et al.

[11] Patent Number: 5,571,254

[45] Date of Patent: Nov. 5, 1996

[54] SPEED VARIABLE MOVING SIDEWALK

[75] Inventors: Hiroshi Saeki; Masao Yasukawa; Kiyotaka Nagai; Mitsukazu Tomoshige; Toshiro Fushiya, all of Mihara, Japan

[73] Assignee: Mitsubishi Jukogyo Kabushiki Kaisha, Mihara, Japan

[21] Appl. No.: 316,571

[22] Filed: Sep. 30, 1994

[30] Foreign Application Priority Data

Oct. 1, 1993 [JP] Japan .................................. 5-246874
Oct. 7, 1993 [JP] Japan .................................. 5-251613

[51] Int. Cl.[6] .......................... B65G 23/00; B66B 21/12

[52] U.S. Cl. .......................... 198/334; 198/324; 198/335

[58] Field of Search .................................. 198/334, 335, 198/792, 465.3, 803.2, 833, 324

[56] References Cited

U.S. PATENT DOCUMENTS

| | | | |
|---|---|---|---|
| 2,936,873 | 5/1960 | Seidman | 198/334 |
| 3,052,337 | 9/1962 | Force | 198/324 |
| 3,747,535 | 7/1973 | Zuppiger | 198/334 |
| 3,859,924 | 1/1975 | Turner | 198/334 |
| 3,899,067 | 8/1975 | Kondo et al. | |
| 3,944,044 | 3/1976 | Hamy | 198/334 |
| 5,040,659 | 8/1991 | Saito et al. | 198/324 |
| 5,044,485 | 9/1991 | Loder | 198/334 |
| 5,178,254 | 1/1993 | Saito et al. | 198/335 |

FOREIGN PATENT DOCUMENTS

| | | | |
|---|---|---|---|
| 0 576 353 | 12/1993 | European Pat. Off. | |
| 2060830 | 6/1971 | France | |
| 2413491 | 10/1974 | Germany | 198/334 |

*Primary Examiner*—Joseph E. Valenza
*Attorney, Agent, or Firm*—McGlew and Tuttle

[57] ABSTRACT

A speed variable moving sidewalk for conveying passengers includes an endless circulating path having inverting sections, a high-speed section and speed variable sections, and a large number of treadboards moving along the circulating path. Each treadboard can move independently as being guided by guide rails and has hooks on its underside which engage shafts of a driving chain for inverting section. The treadboard further has hooks on its underside which engage shafts of a rack chain in order to be driven in the high-speed section and a roller for transversely sliding relative to the neighboring treadboard. A handrail mechanism for the speed variable moving sidewalk includes: with the total length of the moving sidewalk being divided into plural portions, a multiple-number of independent moving handrail portions for allowing passengers to hold thereon, being arranged for the respective portions of the sidewalk while all of the moving handrail portions are arranged without overlapping with one another.

6 Claims, 21 Drawing Sheets

SPEED VARIABLE MOVING SIDEWALK

FIELD OF THE INVENTION

The present invention relates to a moving sidewalk in which endlessly disposed treadboards are successively transported circularly while being transversely slid within a plane so that moving speeds of the treadboards may accelerate or retard.

BACKGROUND OF THE INVENTION

FIG. 20 is a partially sectional side view showing a conventional speed variable moving sidewalk. FIG. 21 is a detailed view showing a portion designated by A in FIG. 20. FIG. 22 is a side view illustrating a principle of a typical driving system for the conventional moving sidewalk. In the figures, numerals 61 and 62 designate treadboards and guide rails, respectively. The system further includes guide rollers 63, link rods 64, driving motors 75, rubber tires 82 and driving motors 83.

The speed variable moving sidewalk is constructed such that treadboards are made to move in a forward or backward direction within a plane while moving speeds of the treadboards are accelerated or retarded by sliding the treadboards transversely with respect to the advancing direction thereof. In FIG. 20, treadboards 61 move forward or backward and right or left along the guide rail 62. Since each treadboard 61 is connected with adjacent treadboards 61 as shown in FIGS. 20 and 21, a link of the treadboards 61 may be considered to be a kind of a chain loop. In order to drive the looped treadboards 61, a plurality of rubber tires 82 being rotated are brought into contact with the lower side of the treadboards 61, whereby the frictional forces given by the tires conveys the treadboards 61. The treadboards in inverting sections are also-driven in the same manner. In some embodiments, the treadboards may be driven using a liner motor 91 as illustrated in FIG. 25.

The conventional system includes a treadboard aligning mechanism, as shown in FIG. 26 (a side view) and FIG. 27 (a transverse sectional view). More specifically, the treadboards 61 are aligned and conveyed along guides 74 while cam followers 73 attached to treadboards 61 being engaged with threaded cams 72. This mechanism is driven by motors 75 which rotate threaded cams 72. Accordingly, the driving system of the whole sidewalk includes in total five driving motors, that is, two driving motors 75 for the inverting sections and three driving motors 83 for driving treadboards (in practice, the number of the driving motors 83 required is decided based on the number of the treadboards and the length of the system). The five motors in the system are controlled so that all the treadboards exactly proceed without any speed difference. As mentioned above, the treadboards are linked with the neighboring ones. This situation will be described in detail with reference to FIGS. 20 and 21. Each treadboard 61, while being connected with adjacent treadboards 61 by means of linking rods 64, is supported by rollers 63 which enfold the guide rail 62. When the treadboard 61 is turned up side down in the inverting section, a fixing link 65 provided on the linking rod 64 is drawn out from the treadboard 61, so that the linking rod 64 can move freely inside a slider 66 as shown in FIG. 20. When the inversion is complete, the linking rod 64 is re-fixed to the slider 66 through the fixing link 65. Then, the treadboard 61 is reconnected with the adjacent treadboard 61 going ahead and proceeds. The transversely sliding action or right and left movement of the treadboards 61 is performed by the movement of the slider 66 along a groove provided inside the treadboard 61.

In the conventional technology of speed variable moving sidewalk systems, provision of a continuous moving handrail has not yet be developed in practice since it is difficult to vary the moving speed of the moving handrail in correspondence with the moving speed of the treadboard which changes widely ranging from a low-speed region to a high-speed region (about two to five times). Therefore, a typical moving handrail is divided into some or several parts as shown in FIG. 28, so that each part of the moving handrail is driven in a different speed approximately equal to respective part of treadboards flowing. In the conventional moving handrail of divided type, overlapping portions is created to form jointing portions between handrail portions 81, 82 and 83 as shown in FIG. 28.

The conventional speed variable moving sidewalk is constructed such that each treadboard is connected with adjacent treadboards while being transversely slidable relative to adjacent treadboards. Hence, if each treadboard is assumed as a constituent of a link, the sidewalk forms a looped structure. This structure, however, presents the following problems.

(1) Any forces, vibrations etc., acted on one treadboard are transmitted to all the other treadboards, particularly, jointing portions receive various forces such as tension, compression, resistance generated by sliding and the like, therefore, the jointing portions should be enhanced in strength, rigidity, durability etc., in order to resist the forces just mentioned. Further, in consideration of impacts caused, especially at start and stop of operations, it is necessary to construct the system totally reinforced in strength, rigidity and durability.

(2) Since some or several driving motors for driving the system must be exactly controlled on their speeds in order to synchronize one with the others, the apparatus needs a complicated configuration and therefore the cost becomes high.

(3) As the length of the apparatus becomes long, the system requires a larger number of .rubber tires abutted against the underside of treadboards for driving. This fact also makes the aforementioned control system of the apparatus more complicated.

(4) Start and stop of operations are performed by way of the rubber tires, so that the provision of emergency stopping function requires an additional number of rubber tires.

As to the moving handrail, since there are overlapping regions at jointing portions between adjacent handrail portions as stated above, the ends of the handrail portions may disturb the proceeding of passengers in some cases, depending on the proceeding direction of the passenger, thereby jeopardizing the passenger. Further, deviation of the proceeding direction of the passenger from the moving direction of the handrail makes the passenger feel uneasy.

OBJECT AND SUMMARY OF THE INVENTION

The present invention is to eliminate the aforementioned defects and drawbacks in the conventional system by constructing a .new system as follows.

(1) In order to solve the problem of the strength, rigidity and durability relating to the jointing portions in the conventional apparatus, each treadboard in the system of the present invention is constructed so as to be able to move independently of the others by eliminating the use of joints between treadboards.

(2) In order to simplify the configuration of the apparatus and therefore reduce the cost thereof, the apparatus of the present invention is designed in such a manner that a plurality of driving motors are mechanically synchronized thereby eliminating the need to exactly control rotational speeds of the motors individually.

(3) The rubber tires for driving are left out of the apparatus to eliminate the problem relating to the use of the rubber tires.

In accordance with a first aspect of the present invention for solving the above problems, a speed variable moving sidewalk for conveying passengers on the upper face thereof, comprises:

an endlessly continuous circulating path extending longitudinally and vertically, comprising:

a pair of inverting sections which are disposed at opposite ends of the sidewalk and each composed of arced guide rails arranged within vertical planes, a high-speed section which is disposed at a center portion of the sidewalk and composed of horizontally extending and substantially straight guide rails, and a pair of speed variable sections which are each disposed between the inverting section and the high-speed section and composed of curving guide rails arranged within horizontal planes;

a large number of treadboards moving along the circulating path, the treadboards being inverted as proceeding vertically in the inverting sections, being transferred horizontally in a longitudinal direction in the high-speed section and being transversely slid right or left relative to neighboring treadboards in the speed variable sections so that the treadboards accelerate or retard to allow passengers to step onto or off from the upper face at end portions of the sidewalk;

a pair of driving chains for the inverting sections which each endlessly keep on circulating vertically and are disposed inside the guide rails in the respective inverting sections disposed at the end portions;

a pair of driving chains for the high-speed section each of which endlessly keeps on circulating vertically and are disposed inside the guide rails in opposite ends of the high-speed section;

a rack chain which is disposed inside the guide rails and outside the pair of driving chains for the high-speed section and endlessly continues to be circulated vertically across the whole part of the high-speed section by engaging the pair of driving chains for the high-speed section; and a pair of motors for line driving which are each disposed at respective extremes of the circulating path and connected to closer one of the driving chains for the high-speed section through a line shaft with a reducing gear so as to drive a corresponding driving chain for the high-speed section at an appropriately reduced speed, wherein each treadboard is able to move independently of neighboring treadboards as being guided by the guide rails, and each of the treadboards comprises: hooks on an underside thereof which engage shafts of the driving chain for the inverting section in order to drive the treadboard in the inverting section; hooks on the underside thereof which engage shafts of the rack chain in order to drive the treadboard in the high-speed section; and a roller disposed in a portion being in contact with a neighboring treadboard in order to enable each treadboard to transversely slide relative to the neighboring treadboard.

In the speed variable moving sidewalk of the present invention, at least two motors for line driving are provided. Each motor drives both of the corresponding driving chain for the inverting section and that for the high-speed section. The pair of driving chains for the high-speed section are engaged with the single rack chain. That is, each pair of driving chains for the inverting section and for the high-speed section are linked with one another by way of the motor, a reducing gear and a line shaft. Further, the pair of driving chains for the high-speed section are linked with one another by way of the rack chain. Therefore, all the chains are mechanically linked. As a result, there is no need for individual control of a particular motor on its rotational speed.

The treadboards of the present invention are not linked with one another and can move independently of the others. The provision of a roller to each treadboard on the portion in contact with its neighboring treadboard facilitates the treadboards to transversely slide relative to the neighboring treadboards. In the inverting sections, the hooks on the underside of each treadboard are engaged with a shaft of the driving chain for inverting section so that the treadboard is driven by the driving chain. In the high-speed section, the hooks on the underside of each treadboard are engaged with a shaft of the rack chain so as to drive the treadboard. In the speed variable sections, the treadboard is not energized directly by chains or other means, but proceeds as being pushed by the following treadboard. Since each treadboard is free from the others as stated above, any conventional problems as to strength, rigidity, durability etc., attributed to the jointing portions cannot occur in this configuration. Further, since the treadboards are driven by the engagements between hooks and shafts of the chains as described above, any difficulty of control over the rubber tires conventionally used cannot occur.

Each treadboard proceeds as being guided by rails. In the high-speed section as well as the speed variable sections, each treadboard takes a position transversely offset relative to the neighboring treadboards and proceeds slantly against the advancing direction.

Another object of the present invention is to provide a handrail mechanism for a speed variable moving sidewalk in which overlaps in jointing portions are left out so as to avert potential dangers and which presents a more conformable riding to the passenger by arranging moving handrails in such a manner that the advancing directions of the moving handrails correspond to the advancing direction of the passenger's body.

A second aspect of the present invention is to achieve the above object, and relates to a speed variable moving sidewalk having the following features as to a handrail mechanism for a speed variable moving sidewalk wherein a large number of treadboards are circularly moved along endless rails composed of vertical portions, and upper and lower portions each being made up of combination of a substantially straight portion and curved portions on a horizontal plane, and are transversely slid relative to one another in upper and lower portions for acceleration or retardation thereof.

(1) The total length of a moving sidewalk is divided into plural portions, and the handrail mechanism for the speed variable moving sidewalk includes: a plurality of independent by moving handrail portions for allowing passengers to hold thereon, being arranged for the respective divided plural portions of the sidewalk while all of the moving handrail portions are arranged without overlapping with one another, each of the moving handrail portions being driven at a speed close to the driving speed of nearby treadboards; and a plurality of guiding plates being disposed at jointing portions between adjoining moving handrail portions to thereby guide passenger's hands from one moving handrail portion to the next moving handrail portion.

(2) In the handrail mechanism for a speed variable moving sidewalk according to the above (1), the moving handrail portion is provided on the surface thereof with comb-like grooves so as to be smoothly connected to the guiding plate.

(3) In the handrail mechanism for a speed variable moving sidewalk according to the above (1), the guiding plate has freely rolling balls or rollers arranged thereon.

(4) In the handrail mechanism for a speed variable moving sidewalk according to the above (1), in order to inform passengers of the existence of a guiding plate, an electric indicator such as a winker etc., a sound/voice indicator and/or air-blowing device is provided solely or in combination on the upper face of or in the vicinity of the guiding plate.

(5) In the handrail mechanism for a speed variable moving sidewalk according to the above (1), the guiding plate is composed of an endless belt and the upper face of the endless belt is driven in the same direction at an approximately identical speed as the upper parts of the adjoining moving handrail portions move.

Since each moving handrail portion is driven independently of the others at a speed close to the moving speed of nearby treadboards, the passenger can move on the sidewalk while holding the moving handrail. Further, an end of the moving handrail portion on the passenger side at the conventional overlapping portion would be obstructing to the passenger. This problem attributable to the overlapping portion, however, does not occur because, in the configuration of the present invention, no overlapping portion exists between neighboring moving handrail portions. Therefore, the passenger's body and his or her hand are to move in the same direction at all time. Moreover the guiding plates provided at jointing portions make it possible to transfer the passenger's hand from one moving handrail portion to the next moving handrail portion in safety.

Since the surface of each handrail portion is provided with comb-like grooves which mate with the guiding plate, this configuration prevents the passenger's hand from being accidentally nipped by the clearance between the handrail and the guiding plate and makes it possible for the passenger to transfer his or her hand from one moving rail portion to the guiding plate in safety.

Since balls or rollers are provided on the upper face of guiding plates, the passenger's hand can move smoothly on the guiding plates.

Since an electric indicator such as a winker etc., a sound/voice indicator and/or an air-blowing device is provided for informing passengers of the existence of a guiding plate, it is possible for the passenger to transfer his or her hand from one moving rail portion to the guiding plate in safety.

Since the guiding plate is composed of an endless belt which moves in the same direction at the same speed as the adjoining handrail portions move, it is possible for the passenger to easily transfer his or her hand from one moving rail portion to the guiding plate.

DETAILED DESCRIPTION OF PREFERRED EMBODIMENTS

Figure 1:
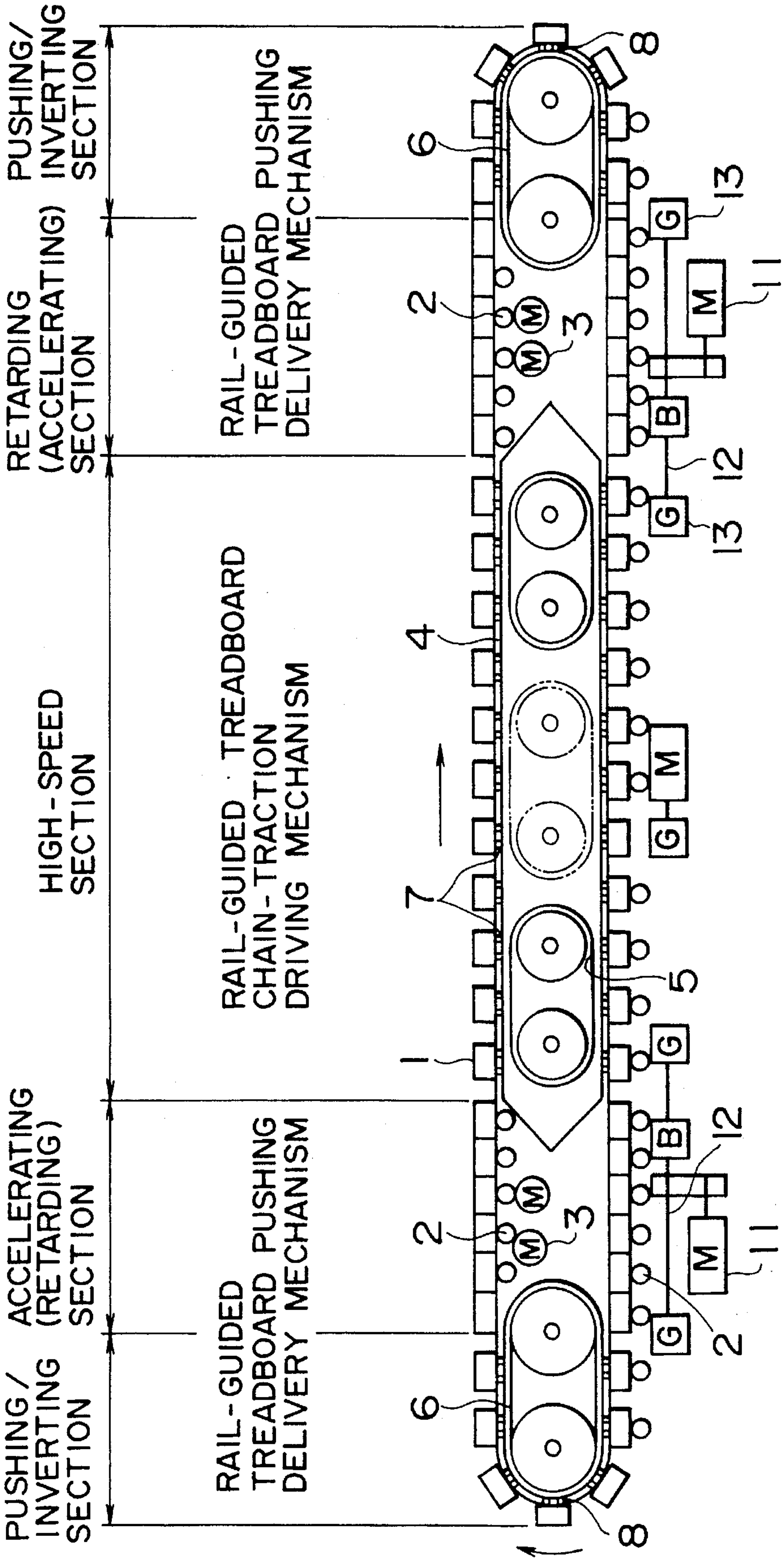
FIG. 1 is a side view showing an entire driving system of a speed variable moving sidewalk in accordance with an embodiment of the present invention.
Figure 2:
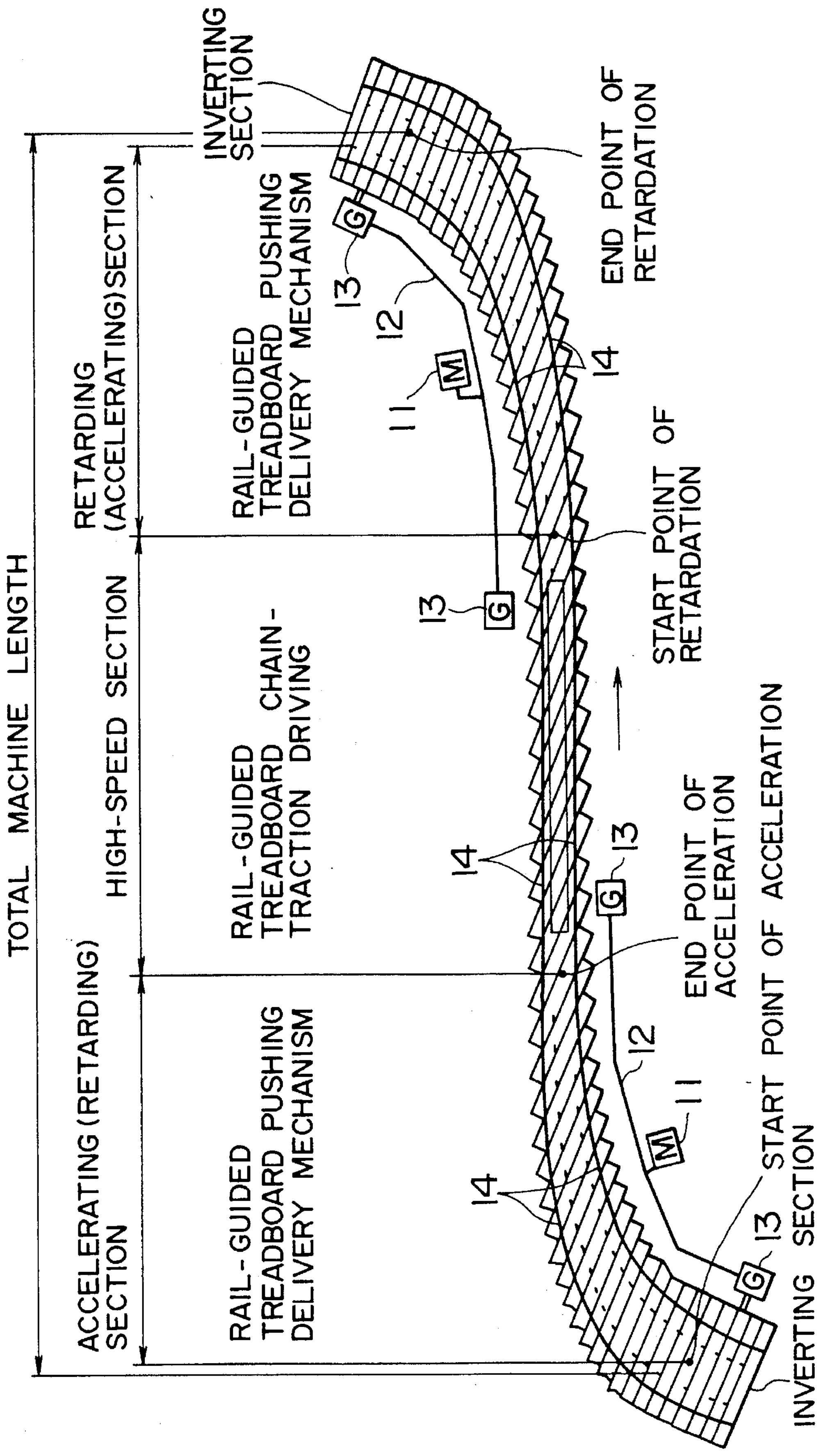
FIG. 2 is a plan view of the same embodiment shown in FIG. 1.

The present invention will hereinafter be described in detail with reference to the accompanying drawings. FIG. 1 is a side view showing an entire driving system in accordance with an embodiment of the present invention. FIG. 2 is a plane view of the same embodiment. In the figures, the driving system includes treadboards 1, supporting rollers 2 for supporting the treadboards, driving motors 3 for driving the supporting rollers, a rack chain 4, high-speed section driving chains 5, inverting section driving chains 6, line-driving motors 11, line shifts 12, reducing gears 13 and guide rails 14. Each treadboard has hooks 7 for driving the treadboard in a high-speed section and hooks 8 for driving the treadboard in an inverting section.

Each treadboard 1 is inverted in the inverting section and then pushed out, while being supported by the supporting rollers 2, onto the guide rails 14 to thereby be delivered to an accelerating section. In the accelerating section, the treadboard 1, as abutting a preceding treadboard 1, proceeds along the guide rails 14 toward the high-speed section. In the high-speed section, the treadboard 1 is driven by a rail-guided treadboard chain-traction driving mechanism. That is, the hooks 7 attached on the underside of the treadboard 1 is made to engage a shaft 25 (which will be described later) of the rack chain 4. The rack of the rack chain 4, in turn, is meshed with the driving chain 5 and driven thereby. Thus, the treadboard is driven by the driving chain 5 for high-speed section. In a retarding section, or from the end of the high-speed section to the start of the other inverting section, the treadboard 1 is not driven by any special means but advances, as abutting the preceding treadboard as in the accelerating section, and is pushed by the following treadboard which is driven by the rack chain in the high-speed section.

In some embodiments, it is possible as shown in FIG. 1 that the treadboards in the accelerating or retarding section are accelerated or braked individually through the supporting rollers 2 using the supporting roller driving motors 3. As to the driving system, two driving motors 11 are disposed as illustrated in FIG. 1, each of which serves to provide driving forces for both the high-speed section and the inverting section as a gateway. More specifically, the driving force of each driving motor 11 is transmitted through the line shaft 12 to two reducing gears 13, which in turn drive the driving chains for inverting section and high-speed section, respectively. In the driving system, the two reducing gears 13 are set so that the chains for inverting section and high-speed section are driven at appropriate respective rotational speeds corresponding to a speed ratio between the inverting section and the high-speed section. As the two motors are linked with one another by way of the rack chain 4 in high-speed section, the load torque (for both driving and braking) can be averaged and shared reciprocally by the two motors. Further, since the motors are driven at the same speed, no complicated control over the speed difference but only a simple instruction on the speed of the motors will be required.

Figure 3:
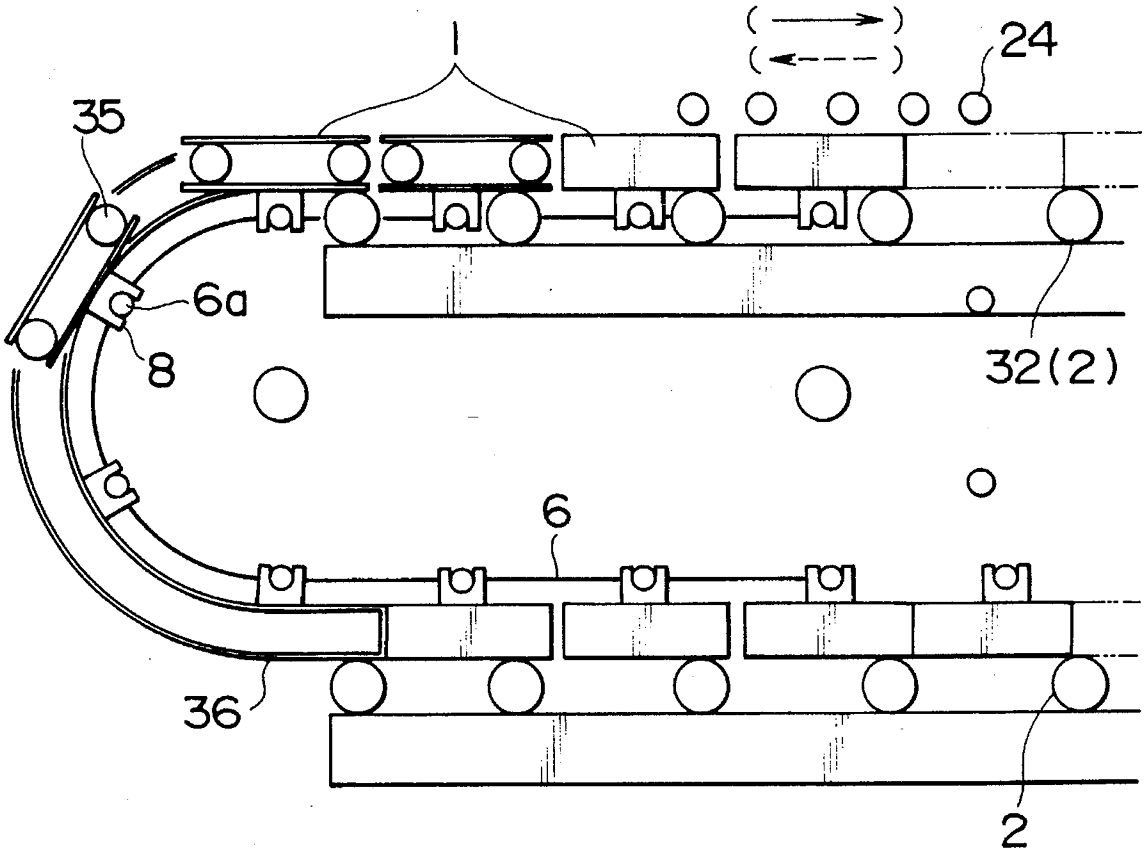
FIG. 3 is a side view showing a structure of a rail-guided treadboard pushing delivery mechanism in an inverting/pushing delivery section in the same embodiment shown in FIG. 1.
Figure 4:
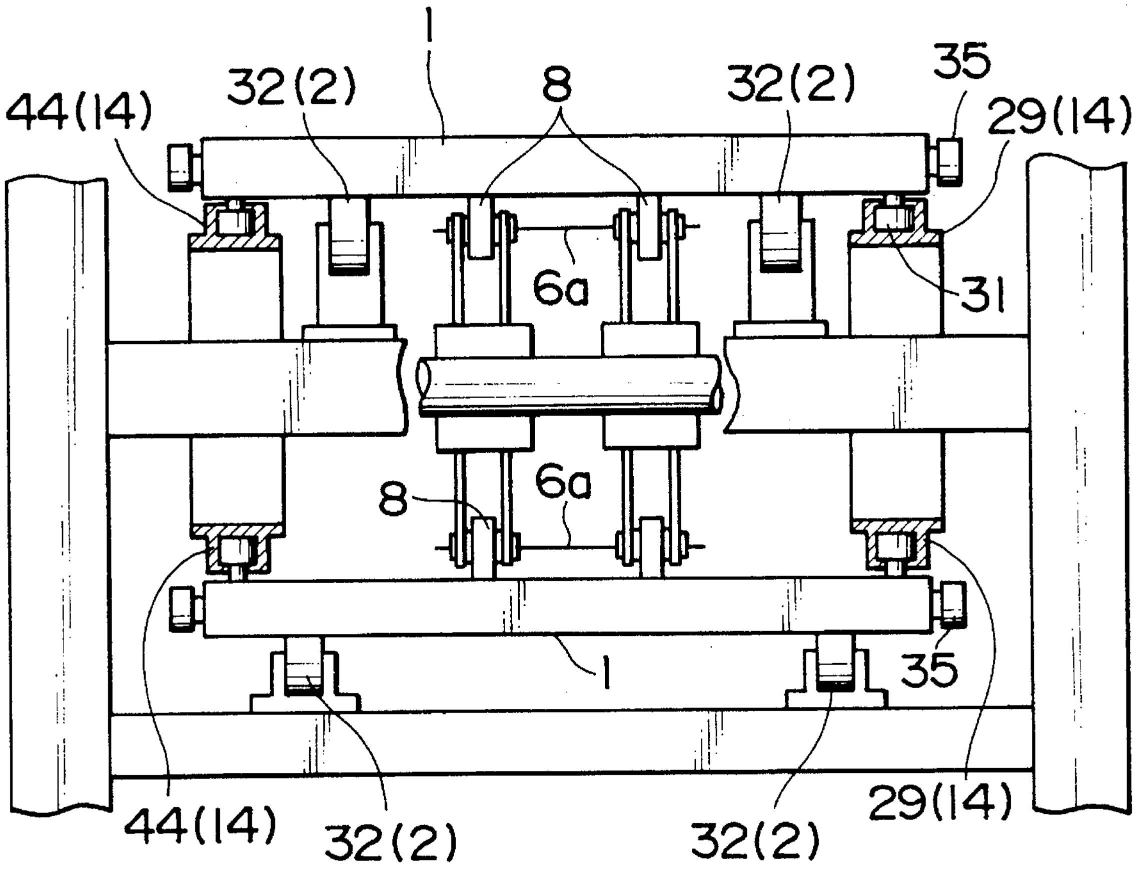
FIG. 4 is a sectional view of the same portion shown in FIG. 3.

FIG. 3 is a side view showing a structure of a rail-guided treadboard pushing delivery mechanism in an inverting/pushing delivery section, and FIG. 4 is a plan view of the same. In these figures, pressing rollers are designated at 24. Reference numerals 29(14) and 31 designate guide rails and guide rollers, respectively. The structure further includes supporting rollers 32(2), cam followers 35 and guide rails (cams) 36.

Each treadboard 1 is separated from the others and has dedicated hooks 8 on the underside thereof. A shaft *6a* of the chain 6 engages the hooks 8 of each treadboard 1 so that treadboards can be transported one by one. At the time of a treadboard 1 being inverted, the treadboard proceeds while the cam followers 35 disposed on both sides of the treadboard are guided by the guide rails 36. When the inverting is complete, the treadboard 1 is supported in the horizontal portion on the upper or lower face thereof by the supporting rollers 32(2). Then, treadboards 1 are successively pushed out horizontally, keeping the same interval, along guide rails 29(14) and 44(14). At this time, the treadboards are slightly spaced from one another. Here, the chain 6 is driven by the reducing gear 13 which in turn is activated through the line shaft 12 as shown in FIG. 1.

Figure 5:
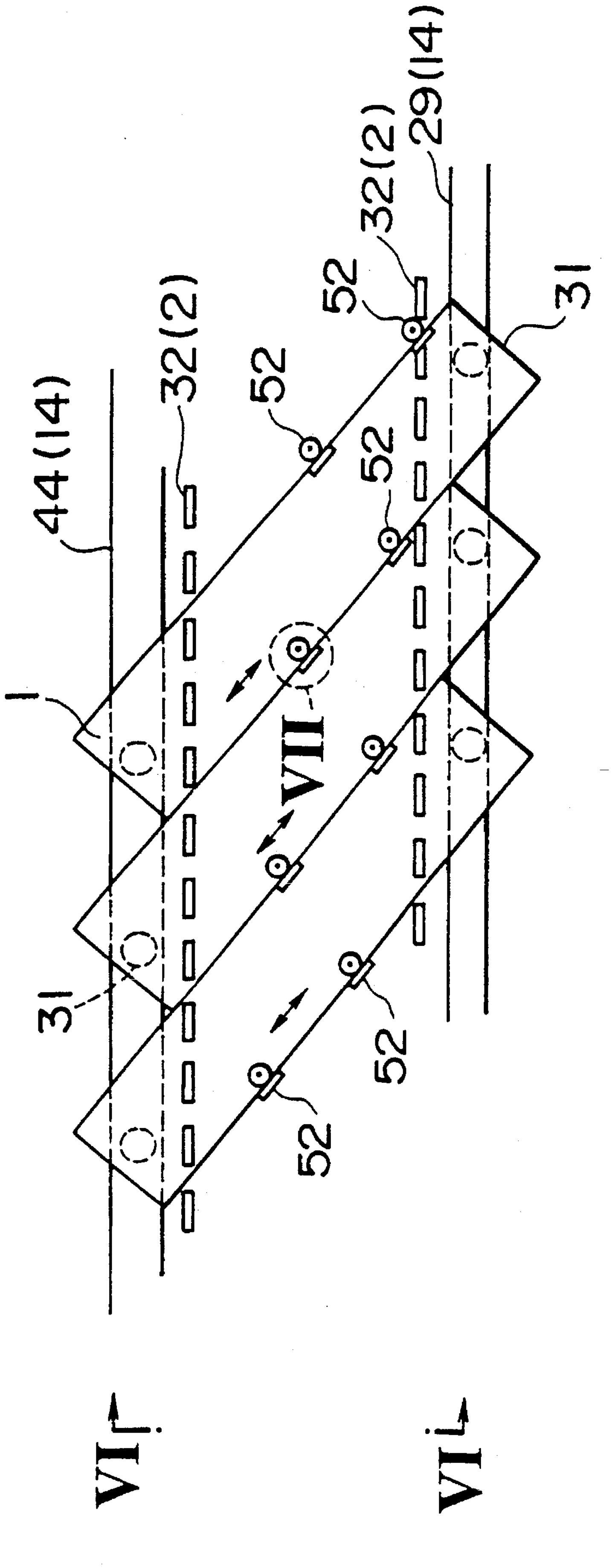
FIG. 5 is a plan view showing a structure of a rail-guided treadboard pushing delivery mechanism in the accelerating section of the same embodiment shown in FIG. 1.
Figure 6:
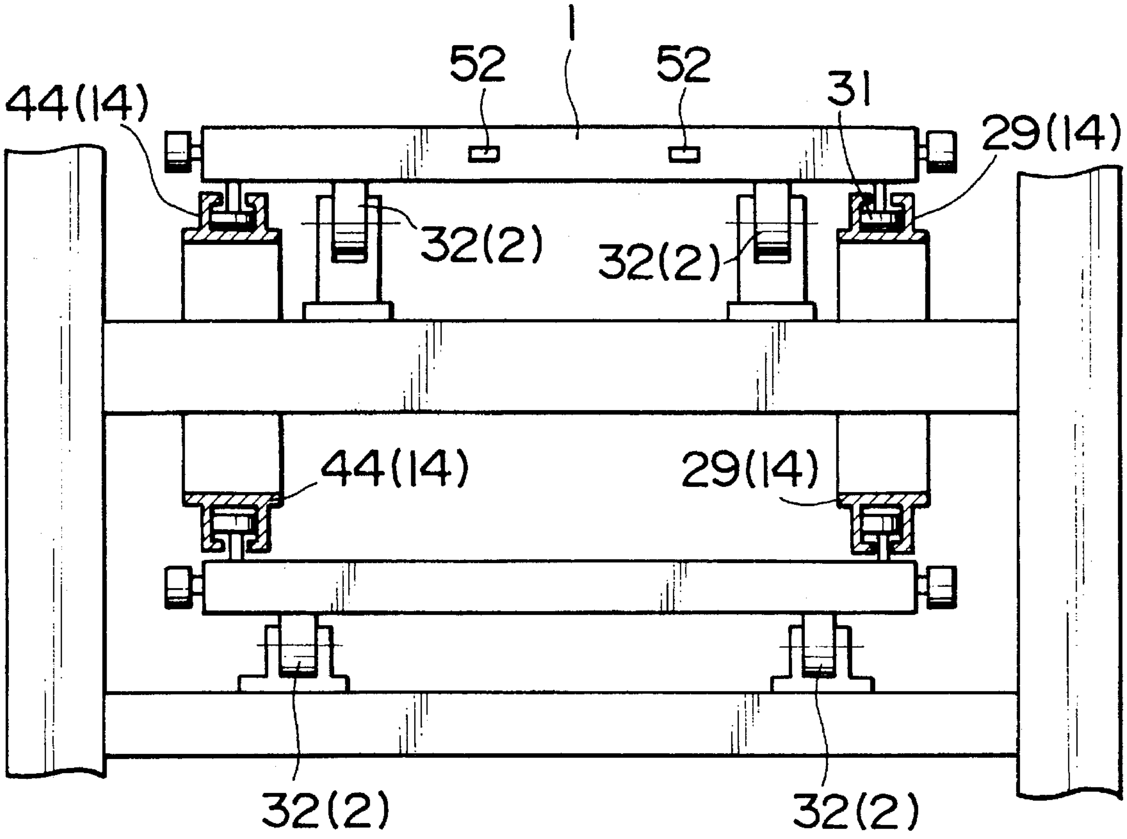
FIG. 6 is a sectional view taken on VI—VI in FIG. 5.

FIG. 5 is a plan view showing a structure of a rail-guided treadboard pushing delivery mechanism in the speed variable section, and FIG. 6 is a sectional view taken on VI—VI (or viewed from the central axial direction) in FIG. 5. In these figures, reference numerals 44(14) and 52 designate guide rails and rollers, respectively. Each treadboard 1 advances as the guide rollers 31 provided therefor being guided by guide rails 29 and 44(14) disposed below treadboards. The guide rails 29 and 44(14) receive the aforementioned pushing force from the treadboard 1 in the inverting section and yield new pushing forces that are tangent to respective guide rails. The thus generated forces are linearly combined to give a transversely sliding force on the treadboard 1. The treadboard 1 is accelerated by the resultant force and conveyed, as being supported by the supporting rollers 32(2) disposed toward the direction of the resultant force. In order to allow the treadboards to be accelerated in close contact with one another, the distance from the start point of acceleration to the end point of acceleration is set at n times the treadboard length or slightly less.

Figure 7:
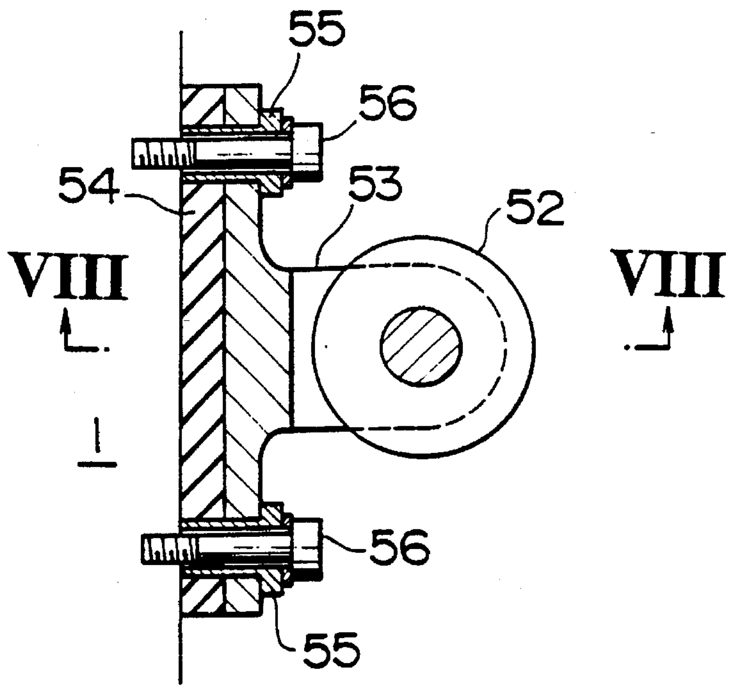
FIG. 7 is an enlarged view of VII-portion in FIG. 5.
Figure 8:
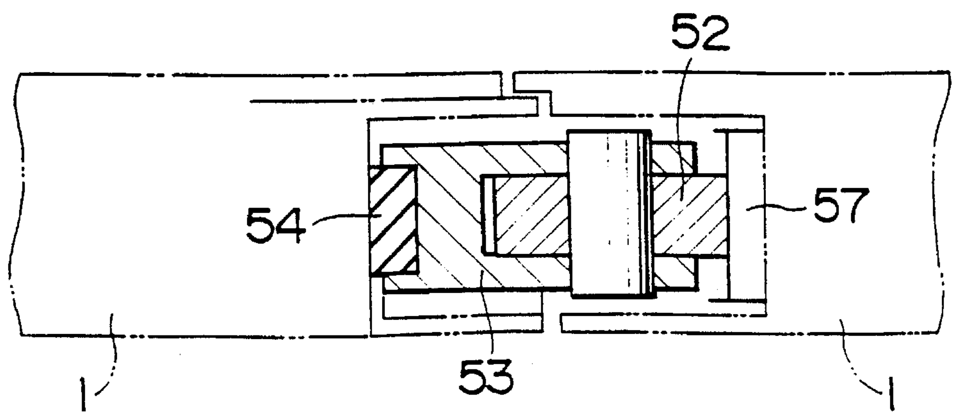
FIG. 8 is a sectional view taken on VIII—VIII in FIG. 7.

FIG. 7 is an enlarged view of VII-portion in FIG. 5 and FIG. 8 is a sectional view taken on VIII—VIII in FIG. 7. In the figures, the VII-portion includes a roller 52, a bearing 53, a resilient rubber plate 54, spacers 55 and fixing bolts 56 and a slide plate 57. The sliding roller is disposed in a depressed portion on the side of the treadboard 1 since the treadboard proceeds in transversely sliding contact with the adjacent treadboard. More specifically, the roller 52 is supported by the bearing 53 which is in turn attached to the treadboard 1 through the resilient rubber plate 54, and serves as a transversely sliding roller and comes into contact with the neighboring treadboard 1. Here, in order for the resilient rubber plate 54 not to be tightly contacted and to present resiliency, the fixing bolts 56 are fixed with the height thereof being defined by the spacers 55. Although, in the prior art, the treadboard is brought into sliding contact with the other treadboard by means of the slider 66, the roller 52 in the present invention allows the treadboard 1 to come into rolling contact with the other. Therefore, the treadboard can slide smoothly with extremely less resistance and less friction. Further, even if the aforementioned distance between the start point of acceleration and the end point of acceleration is shortened, the resilient rubber plates 54 can be compressed so that the treadboards 1 are brought into fully contact with the neighboring treadboards via the rollers 52. In consequence, this feature eliminates the need to extremely enhance the manufacturing accuracy for treadboards. Further, if an excessively strong force is acted on the treadboards by any reason, the resilient rubber plates 54 play a role as dampers. In this accelerating section, transportation of the treadboards 1 in pertinent positions and postures can be assured by the existence of the guide rollers 31 which are guided by guide rails 29 and 44(14) and due to the fact that the treadboards 1 are in fully contact with one another.

Figure 9:
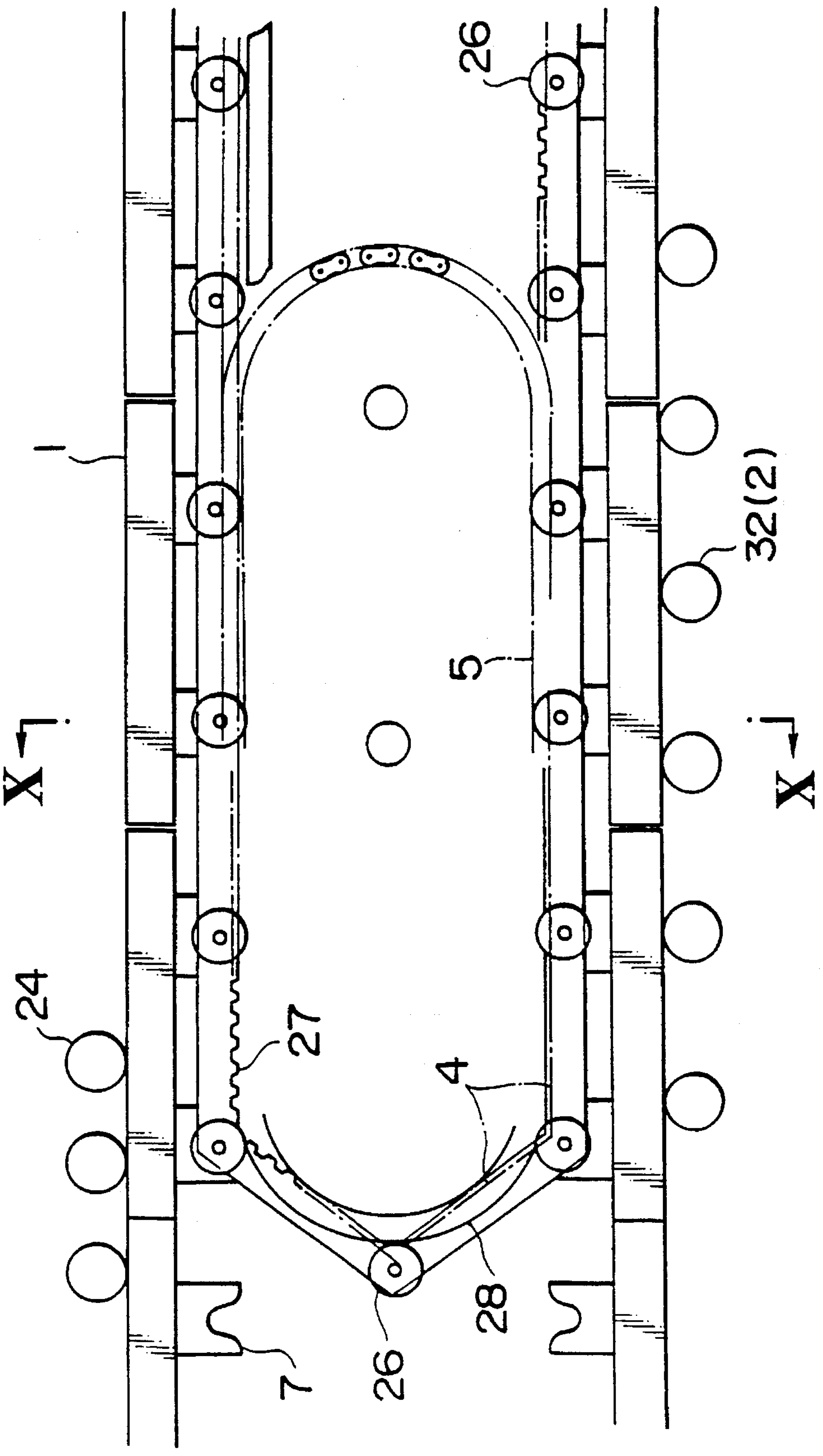
FIG. 9 is a side view showing a structure of a rail-guided treadboard chain-traction driving mechanism in a high-speed section of the same embodiment.
Figure 10:
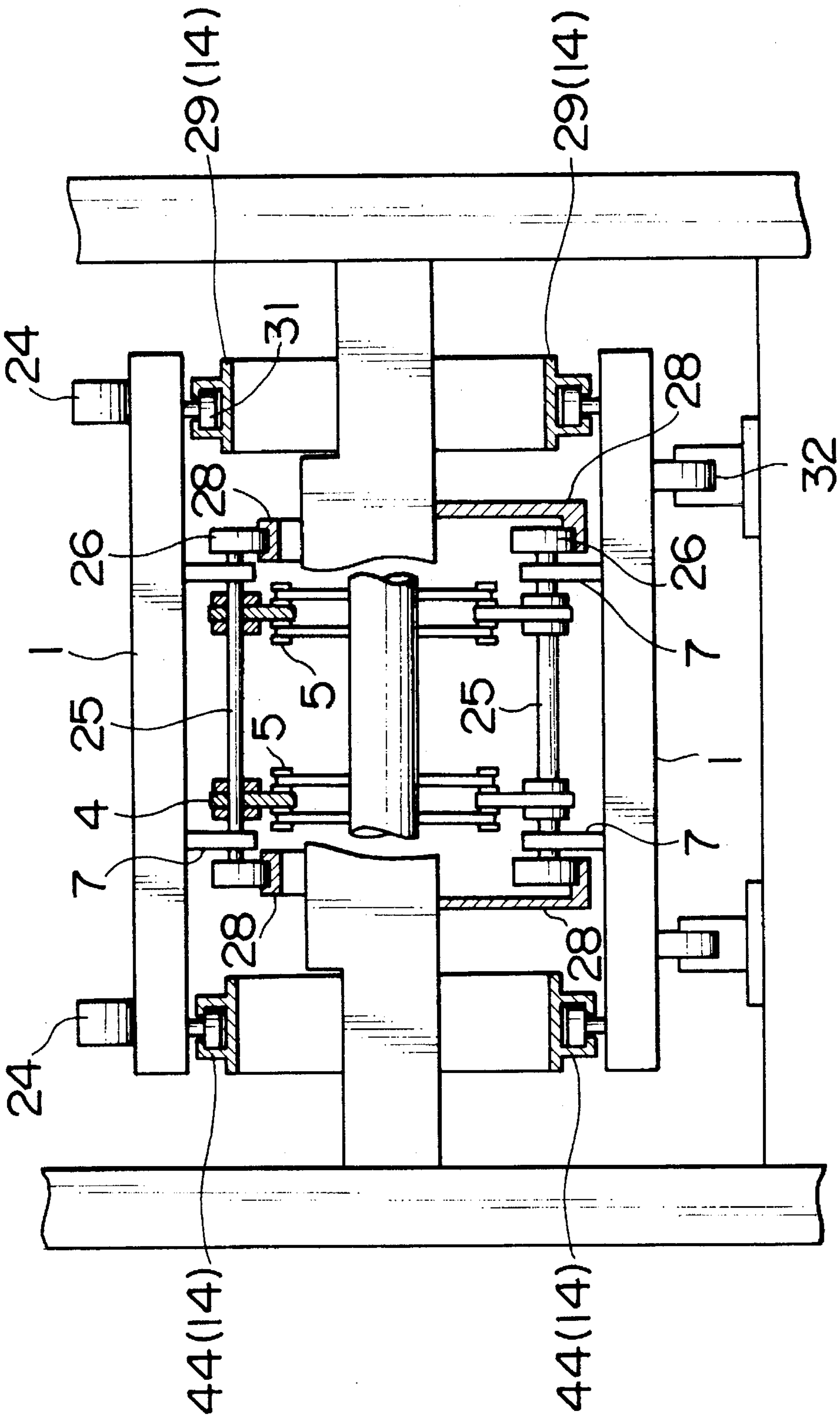
FIG. 10 is a sectional view taken on X—X in FIG. 9.

FIG. 9 is a side view showing a structure of a rail-guided treadboard traction driving mechanism in the high-speed section. FIG. 10 is a sectional view taken on X—X in FIG. 9. In the figures, the mechanism includes treadboards 1, a rack chain 4, high-speed section driving hooks 7, pressing rollers 24, shafts 25 of rack chain 4, supporting rollers 26, racks 27, cams 28, guide rails 29 and 44(14), guide rollers 31 and supporting rollers 32. When, after the end point of acceleration, a treadboard 1 reaches a position where the breadboard 1 is transferred to the high-speed section, the dedicated hooks 7 attached on the underside of the treadboard 1 mate with respective shafts 25 of the rack chain 4 having racks 27. The fitting position is limited to only the one point. Therefore, at that point, the velocity of the rack chain 4 is set equal to the proceeding speed of the treadboard while the pitch between shafts 25 of the rack chain 4 is set equal to the distance between the hooks 7 on the treadboard 1. Since both ends of the rack chain 4 may be assumed to rotate based on the same principle with that of a four-teeth gear, the velocity or the position of the rack chain 4 changes roughly. Hence, the aforementioned fitting position varies too. In order to prevent this variation, or in order to control the fitting position at the same point, cams 28 are provided which regulate the position of the shaft 25 when the supporting rollers 26 coaxially attached on the shaft 25 pass through the cams 28.

Figure 11:
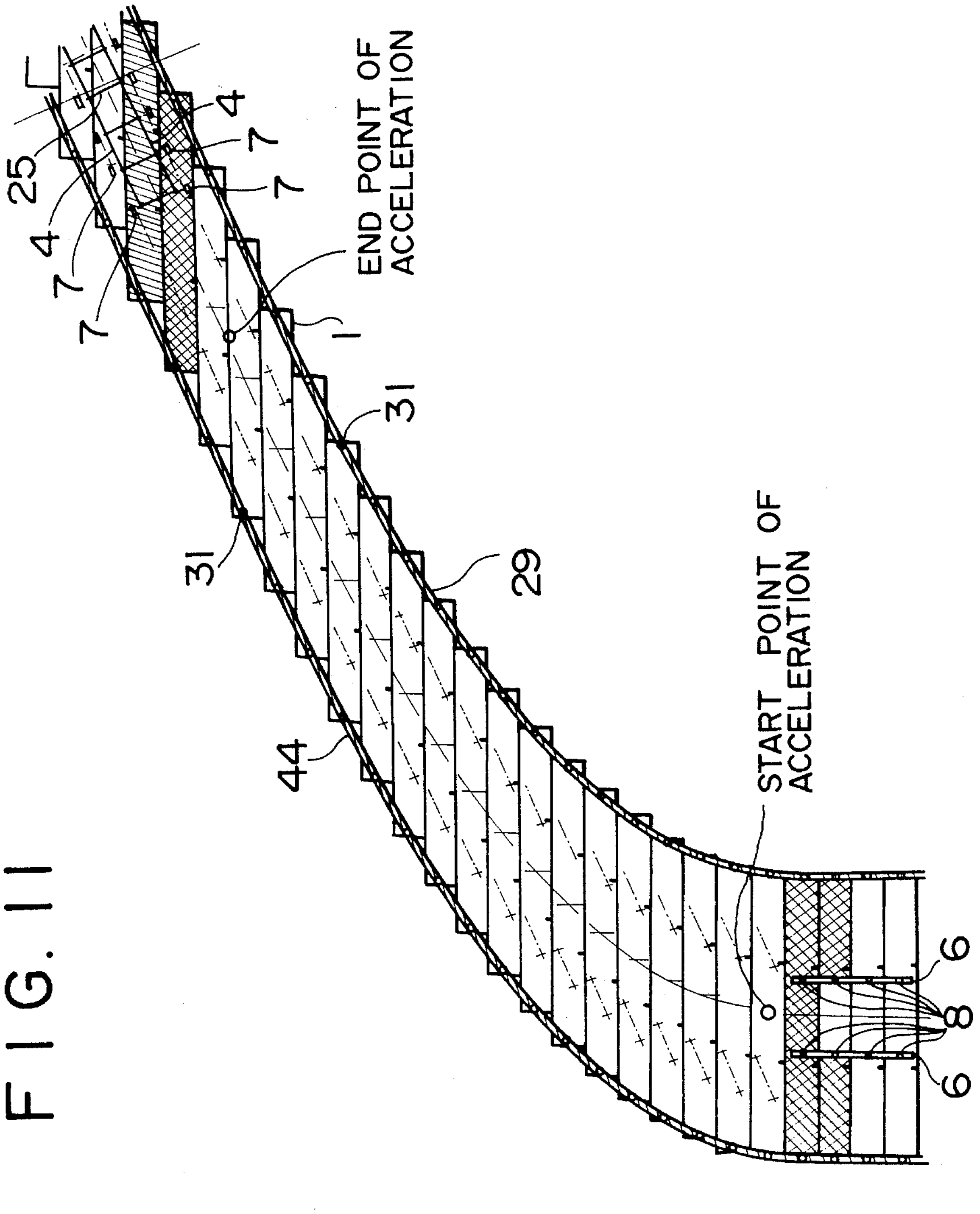
FIG. 11 is a plan view showing a moving sidewalk of the same embodiment.

FIG. 11 is a plan view showing a moving sidewalk of the embodiment. As shown in the figure, treadboards 1 are exactly regulated and assured in their positions and postures by the engagement of hooks 8 in the inverting/pushing delivery section as shown in FIG. 3, by the engagement of hooks 7 in the high-speed section as shown in FIG. 9, or by the guide rails 29 and 44(14) which guide and constrain the guide rollers 31 attached on the treadboard 1. Therefore, the treadboard 1 can be transferred to the high-speed section in a state in which the treadboard 1 is closely abutted against the preceding treadboard 1. The treadboard 1 having transferred from the accelerating section to the high-speed section, proceeds being supported by supporting rollers 26 on the shaft 25 of the rack chain 4 which the hook 7 engages. Since the treadboards 1 on the rack chain 4 do not need to be in contact with the neighboring ones, the treadboards 1 moves with the roller 52 shown in FIG. 7 being free. That is, the treadboard 1 in the high-speed section is moved by the rack chain 4 and no other driving force or braking force does act on the treadboard. The driving in the high-speed section is conducted by the driving chain 5 which mates with the rack 27 of the rack chain 4. The driving chain 5 is driven in a velocity reduced in an appropriate ratio by the reducing gear 13 which in turn is energized through the line shaft shown in FIG. 2. The treadboard 1 having passed through the high-speed section is pushed out to the opposite inverting section shown in FIG. 3. The thus delivered treadboard 1 is positioned by the similar structure as stated above. Repetitions of the above operation sequence constitute the circulating loop of the treadboards 1.

Figure 12:
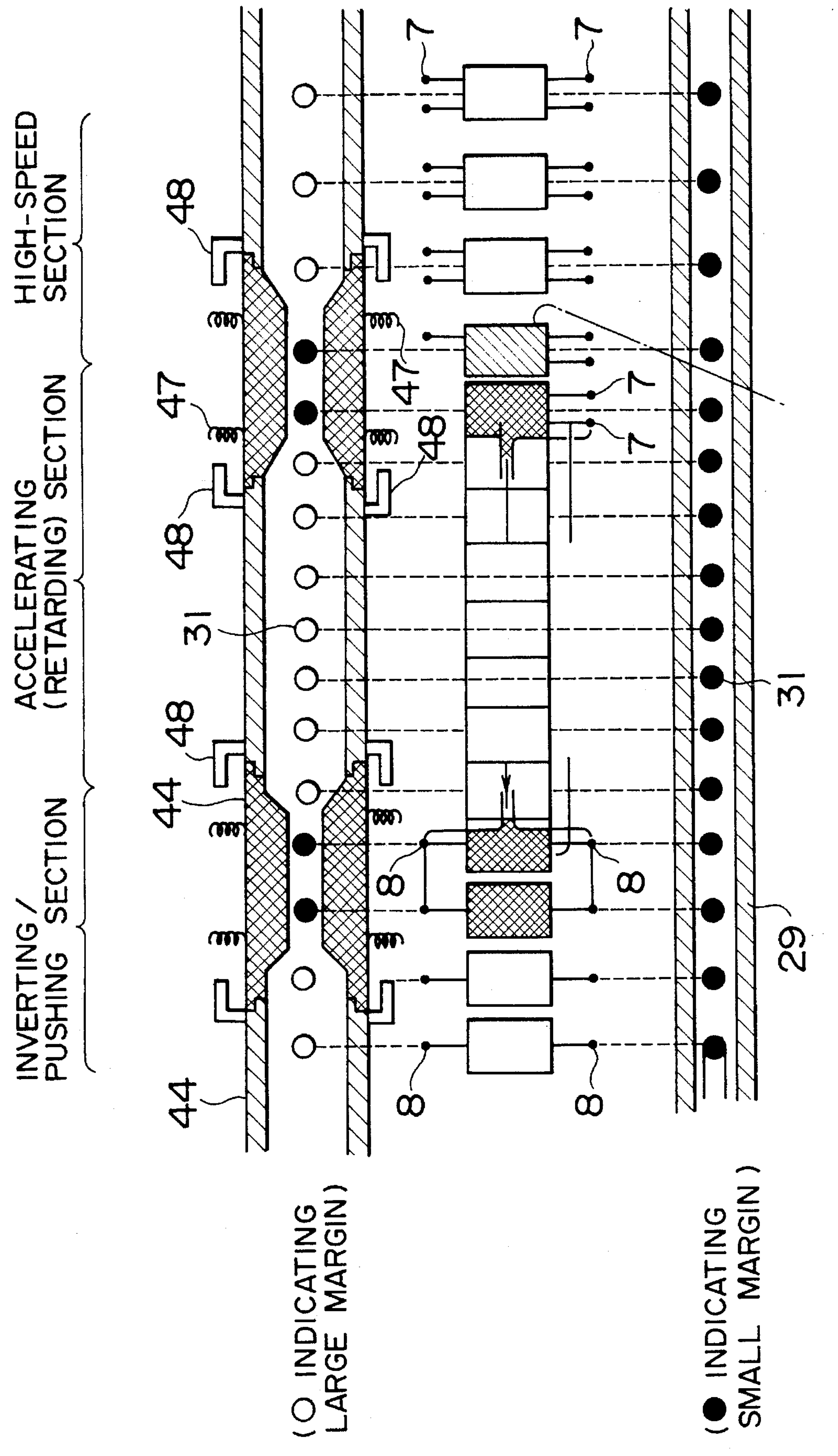
FIG. 12 is an illustrative view showing a mechanism for allowing treadboards to proceed in proper postures in the same embodiment.

FIG. 12 is a diagram illustrating the mechanism for allowing the aforementioned treadboard 1 to proceed in proper postures and showing the devices of guide rails 29 and 44(14). In the figure, reference numerals 7 and 8 designate the driving hook for high-speed section and the driving hooks for inverting section, respectively. Reference numeral 31 designates the guide roller. Designated at 29 and 44 are guide rails. Numerals 47 and 48 designate a spring and a stopper, respectively. If the guide rollers 31 are fitted closely in guide rails 29 and 44(14), the treadboards 1 as well as the guide rails 29 and 44(14) must be finished with high precision. For this reason, in the embodiment, the guide rails for guiding the treadboards 1 are constructed in such a manner that the guide rail 29 (14) is formed with a narrower width leaving a smaller margin while the guide rail 44(14) is formed with a greater width leaving a larger margin. This structure allows the treadboard 1 to move more smoothly and provides a greater tolerance in assembling. Still, the treadboard 1 must be conveyed in high-precision postures at the fitting positions where dedicated hooks 7 or 8 of the treadboard 1 are engaged. To deal with this, the margin between guide rail 44 and guide roller 31 is set small in these regions, in order to allow the treadboard 1 to advance keeping its posture with a higher precision. To deal with a case where the guide roller 31 receives too large resistance or friction in that region, the guide rail 44 is provided with springs 47 and stoppers 48 so that the springs 47 allow the portion of the guide rail 44 to broaden up to the original width while the stoppers 48 prevent the guide rail from broadening more than that. Further, the guide rails 29 and 44 are formed with slip-out protecting means engaging with the guide rollers 31, in order to prevent treadboards 1 from rising up during driving. Moreover, pressing rollers 24 are provided in positions where the shafts 25 of the rack chain 4 are fitted in the hooks 7 of the treadboard 1 and where the roller of the chain 6 is fitted in the hooks 8, to thereby prevent the treadboard 1 from rising up as well as to assure the fittings.

As has been detailed heretofore, the following advantages can be obtained by the features of the embodiment, or specifically, by freeing each treadboard from neighboring ones and adopting chain drives for driving the treadboards in the inverting sections and the high-speed section.

(1) No treadboard is affected by the neighboring treadboards and therefore the forces acted on each treadboard are small, so that it is possible to simplify the structure of the system and make the system less weight.

(2) The maintenance of the system can be simplified, especially for replacing treadboards.

(3) Since different parts perform different functions, durability of parts and therefore the interval of the maintenance can be lengthened. Further, reduction of the power consumption can be achieved by the adoption of the rolling frictional contact between the sliding portions of the treadboards and by the use of larger driving rollers.

(4) The driving control can be markedly simplified because of less number of driving motors used and no need of speed control between the motors.

Figure 13:
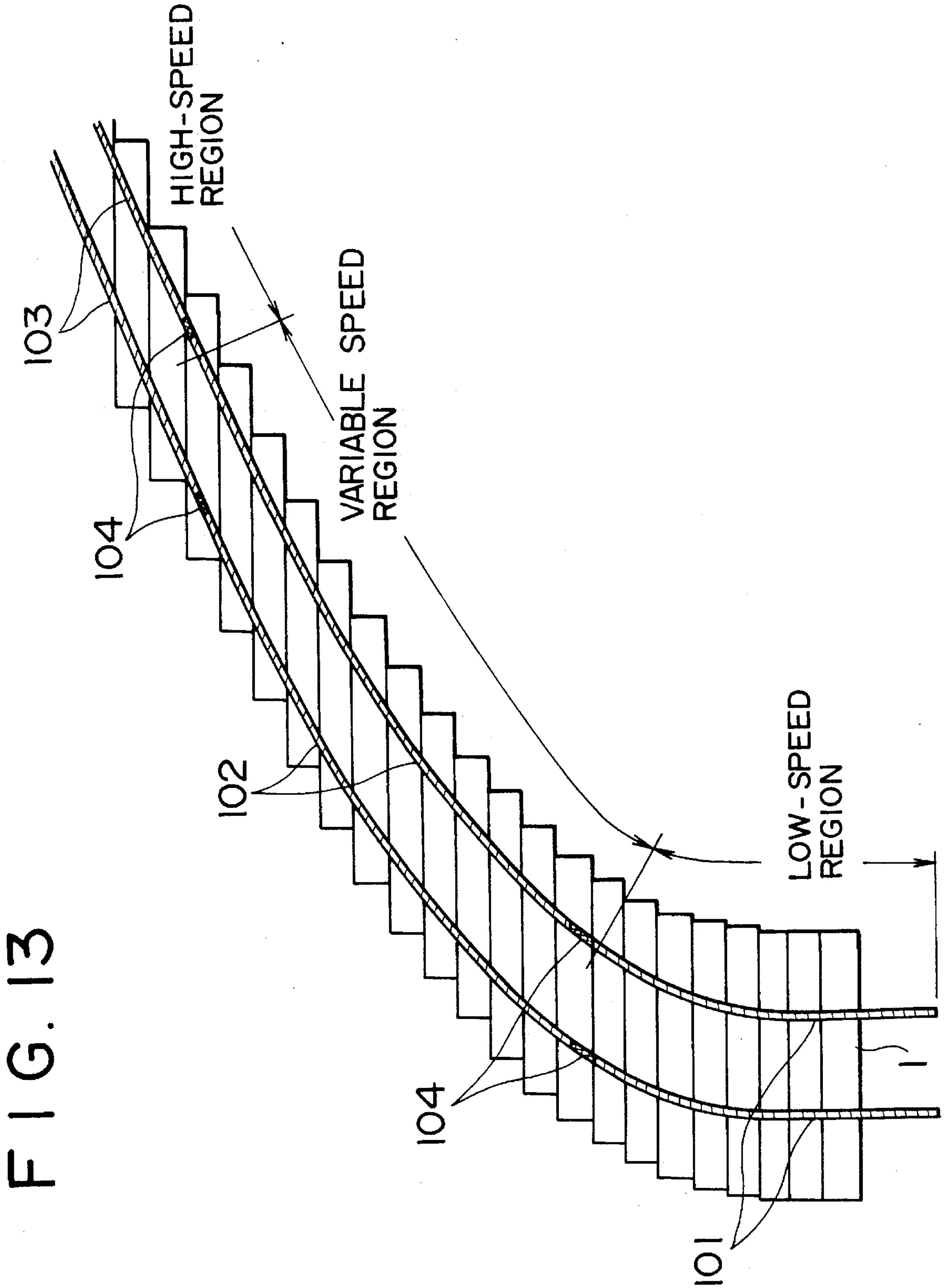
FIG. 13 is a partial plan view showing a handrail system for a speed variable moving sidewalk in accordance with an embodiment of the present invention.
Figure 14:
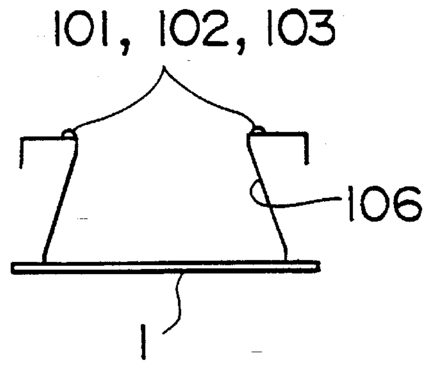
FIG. 14 is a sectional view showing a typical part of the moving sidewalk in the same embodiment.

FIG. 13 is a plan view showing a .handrail system for a speed variable moving sidewalk in accordance with an embodiment of the present invention. Here, the figure shows only a half of the whole system since the system has a point-symmetric structure. FIG. 14 is a sectional view showing a typical part of the same sidewalk. In the figures, moving handrail portions 101, 102 and 103, independently serve for the low-speed range, the accelerating range and the high-speed range, respectively, and run circularly at speeds close to the speeds of treadboards in respective regions. Guiding plates 104 are provided at the joints between the moving handrail portions 101 and 102 as well as between the handrail portions 102 and 103. Each guiding plate 104 is fixed or integrated on the wainscot panel (the inside panel).

Figure 15:
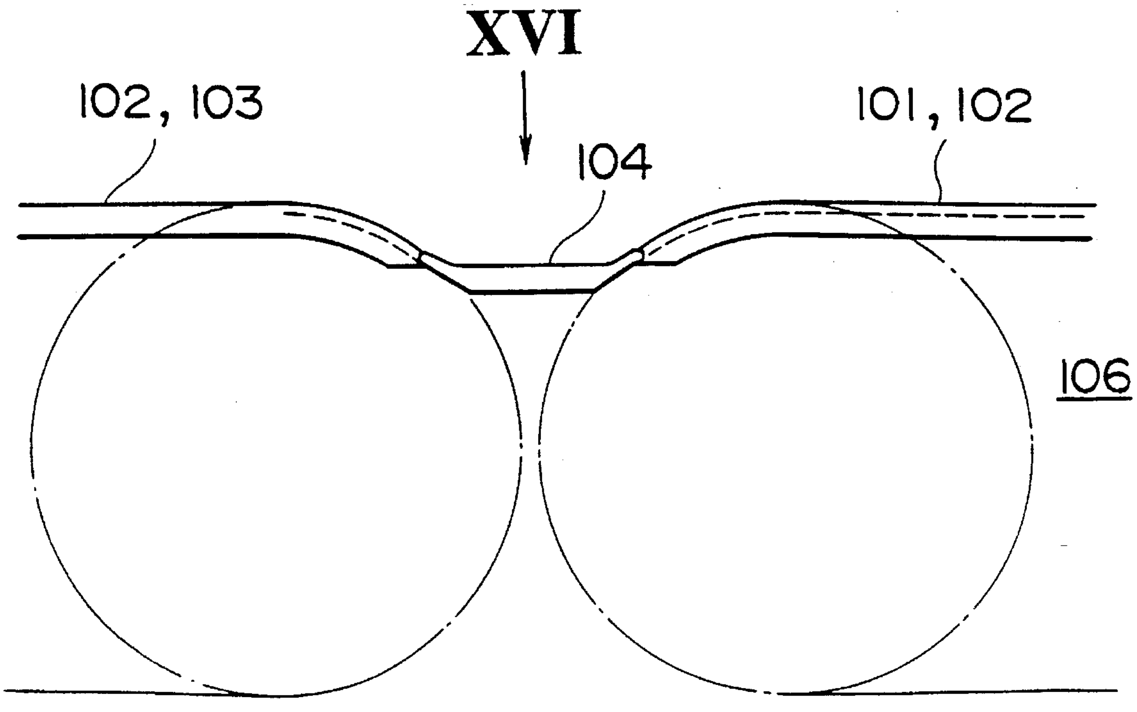
FIG. 15 is a side view showing a detail of a joint portion of the handrail shown in FIG. 13.
Figure 16:
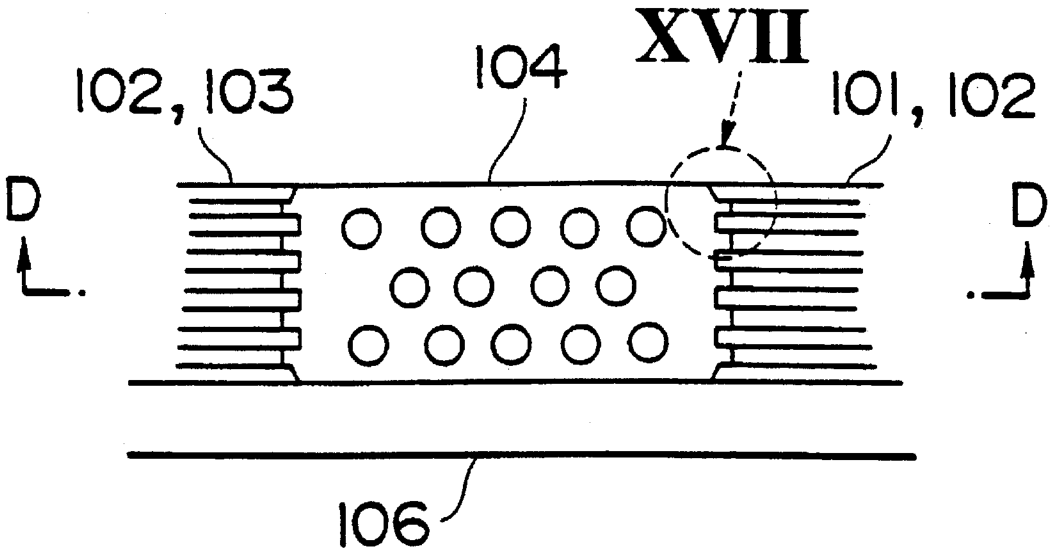
FIG. 16 is a plan view of the same joint portion, viewed from the top.
Figure 17:
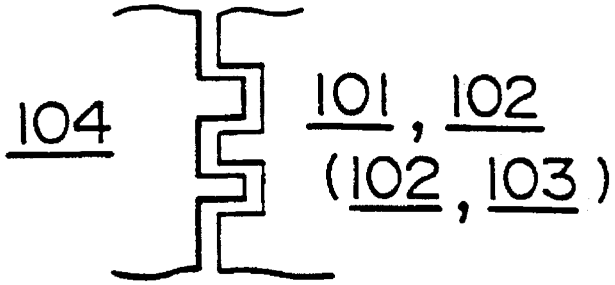
FIG. 17 is an enlarged view showing a portion indicated by XVII in FIG. 16.

FIG. 15 is a side view showing a detail of a joint portion between the handrail portions shown in FIG. 13. FIG. 16 is a plan view of the same joint portion, viewed from the top (from XVI-direction in FIG. 15). FIG. 17 is an enlarged view of a portion indicated by XVII in FIG. 16. As shown in FIGS. 16 and 17, each of the moving handrail portions 101, 102 and 103 has a comb-like pattern on the surface thereof similar to that provided on treadboards and mates with the guiding plate 104 in the joint portion between the moving handrail portions shown in FIG. 15.

Figure 18:
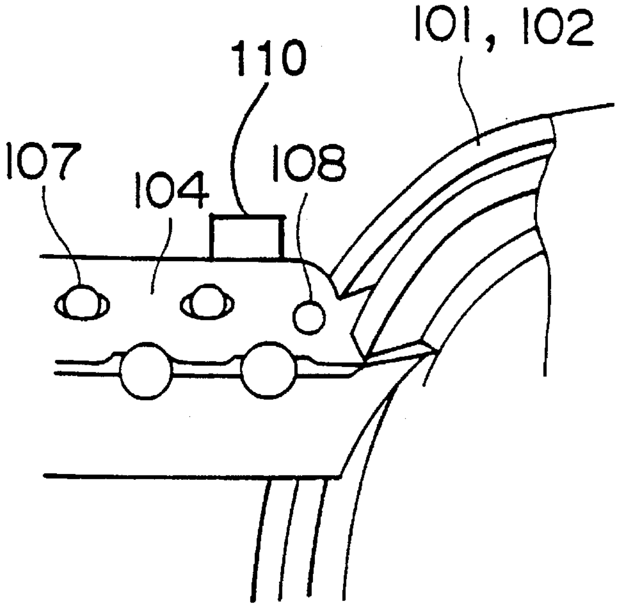
FIG. 18 is a perspective view showing the top face of a guiding plate in the same embodiment.

FIG. 18 is a perspective view showing the top face of the guiding plate. As illustrated, the guiding plate 104 has claws at the ends thereof which mate with the moving handrail portion 101, 102 or 103. The surface of the guiding plate must be well polished for eased sliding, but in order to assure further smoothness, balls 107 or rollers may be provided on the surface of the guiding plate as illustrated in FIG. 18, whereby the passenger's hand can transfer further smoothly to the next handrail portions 102 or 103 even when his or her hand is propped on the guiding plate. Additionally, an air blow hole 108 is provided as illustrated in the guiding plate 104 or in the vicinity thereof so as to blow air against the passenger's hand approaching in order to attract his or her attention. Alternatively, an electric, sound or voice indicator 110 announce etc., may be used solely or in combination so that it is possible to give a further sense of security to the passenger.

Figure 19:
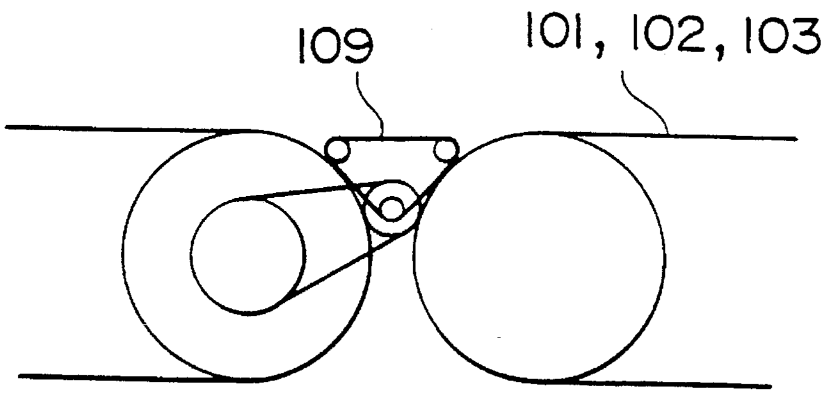
FIG. 19 is a side view showing another configuration of a guiding plate.
Figure 20:
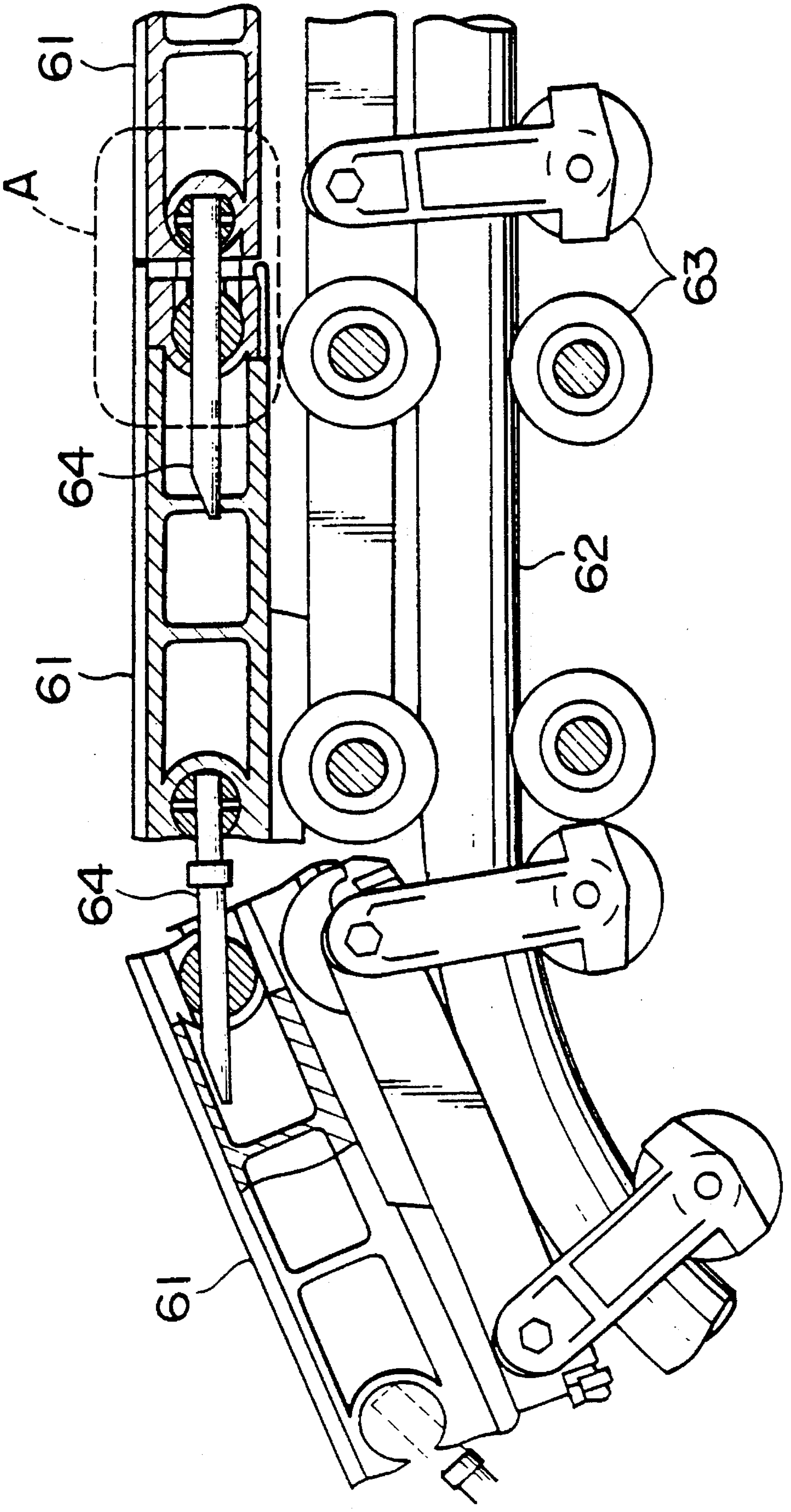
FIG. 20 (PRIOR ART)
FIG. 20 is a side view showing a prior art speed variable moving sidewalk.
Figure 21:
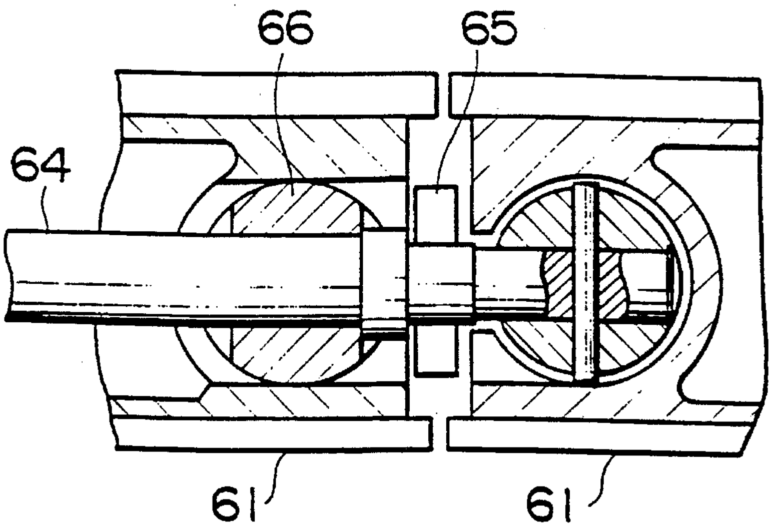
FIG. 21 (PRIOR ART)
FIG. 21 is a detailed view showing a portion designated by XXI in FIG. 20.
Figure 22:
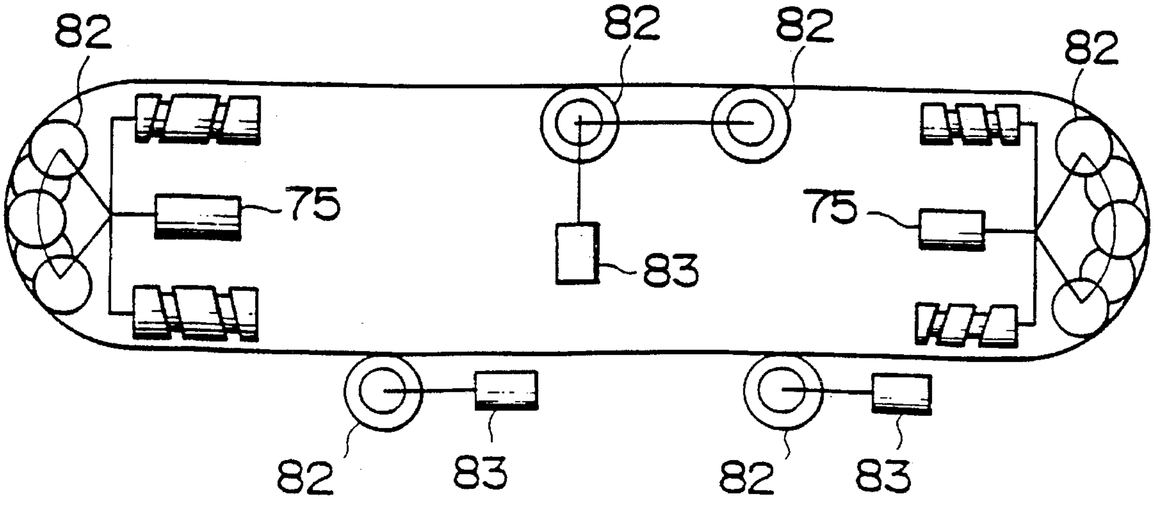
FIG. 22 (PRIOR ART)
FIG. 22 is a side view illustrating a principle of a typical driving system for the prior art moving sidewalk.
Figure 23:
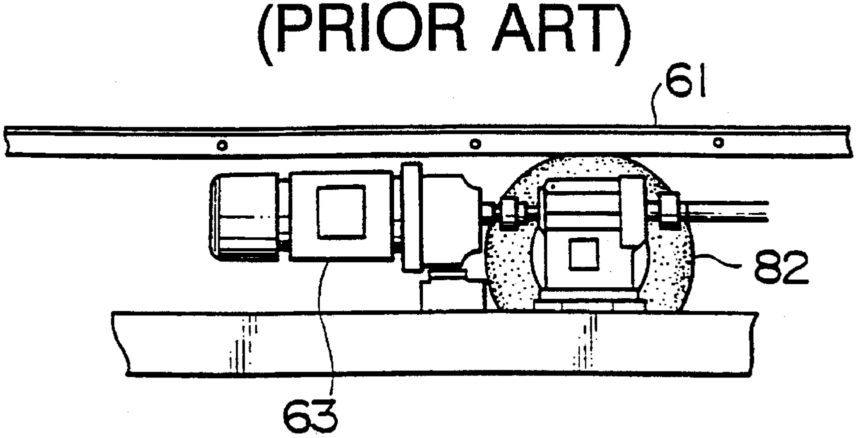
FIG. 23 (PRIOR ART)
FIG. 23 is a side view showing a treadboard driving device in the prior art example.
Figure 24:
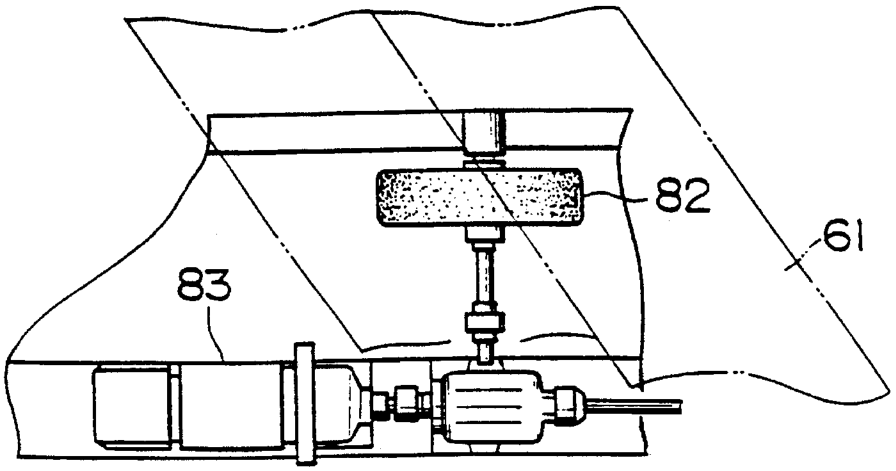
FIG. 24 (PRIOR ART)
FIG. 24 is a plan view of the same device.
Figure 25:
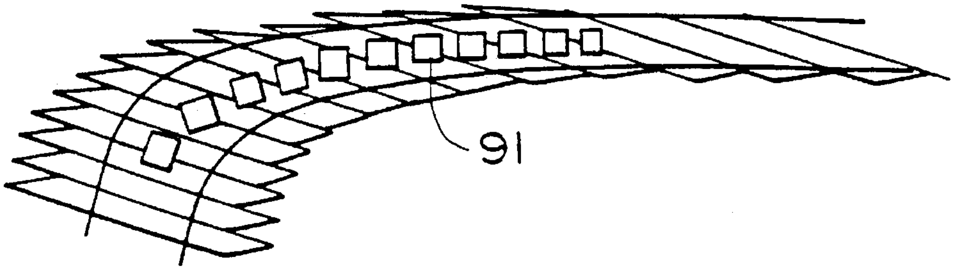
FIG. 25 (PRIOR ART)
FIG. 25 is a plane view showing a moving sidewalk driven by a linear motor.
Figure 26:
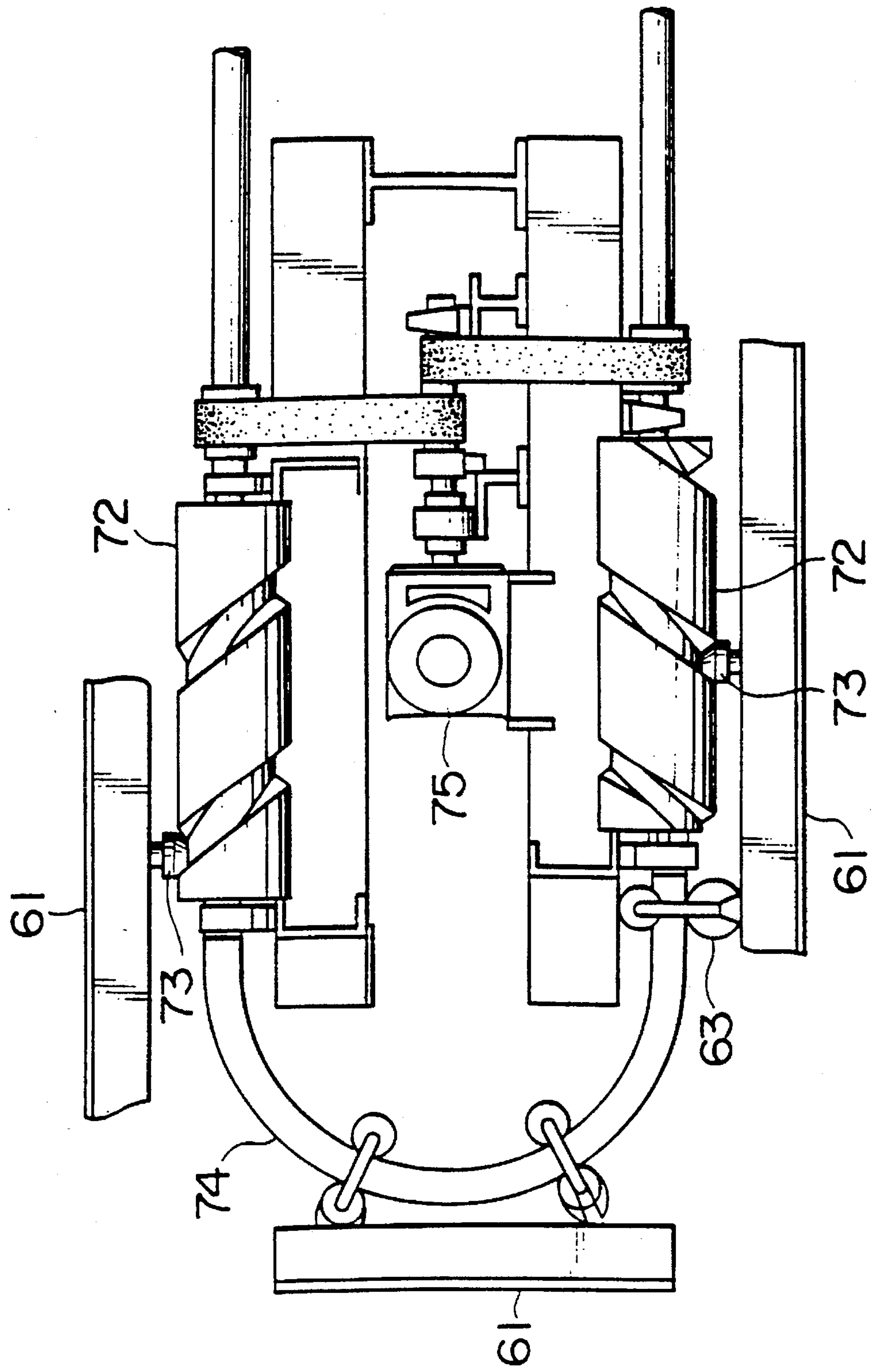
FIG. 26 (PRIOR ART)
FIG. 26 is a side view of a prior art treadboard aligning mechanism.
Figure 27:
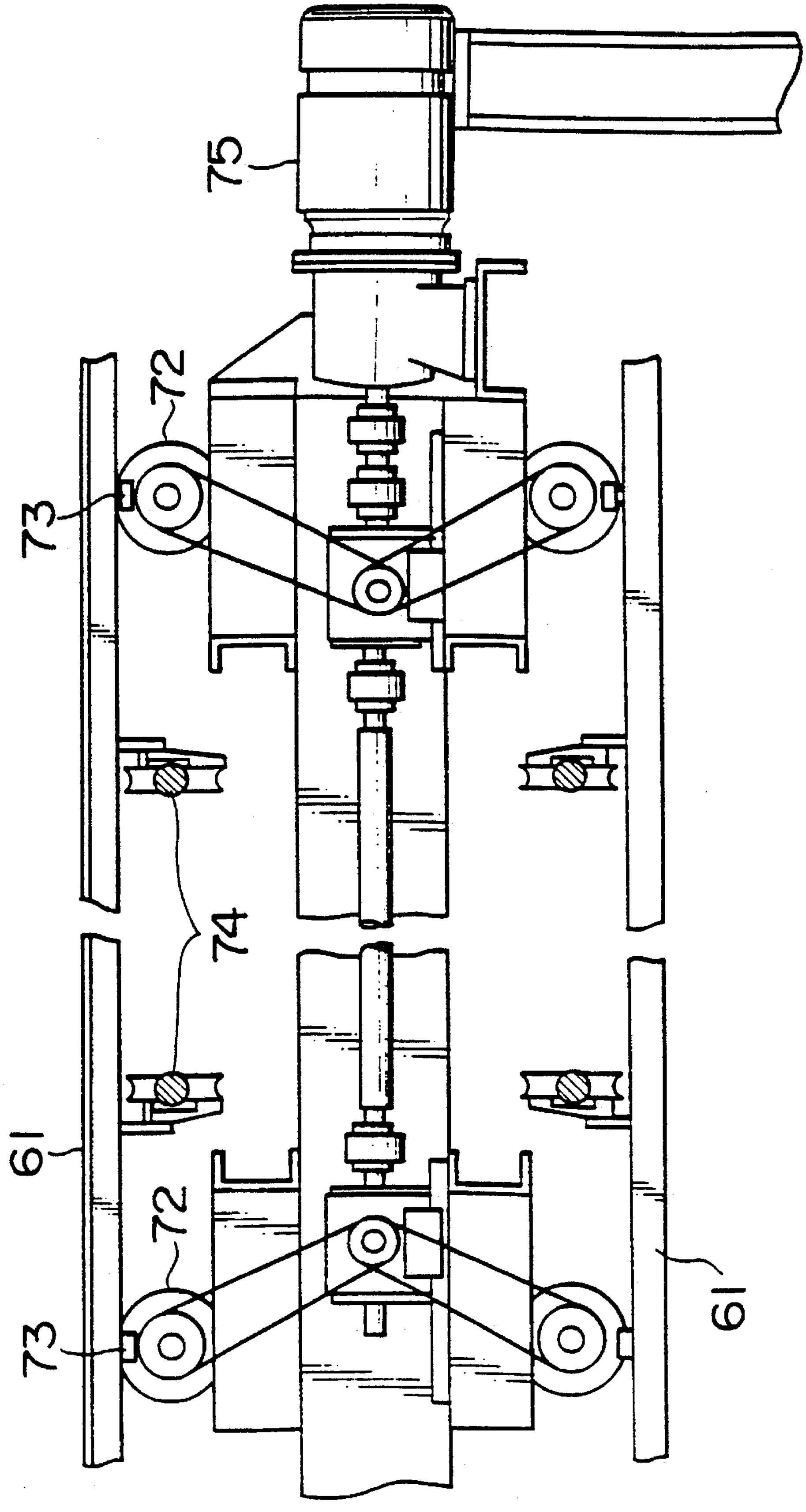
FIG. 27 (PRIOR ART)
FIG. 27 is a plan view of the same mechanism.
Figure 28:
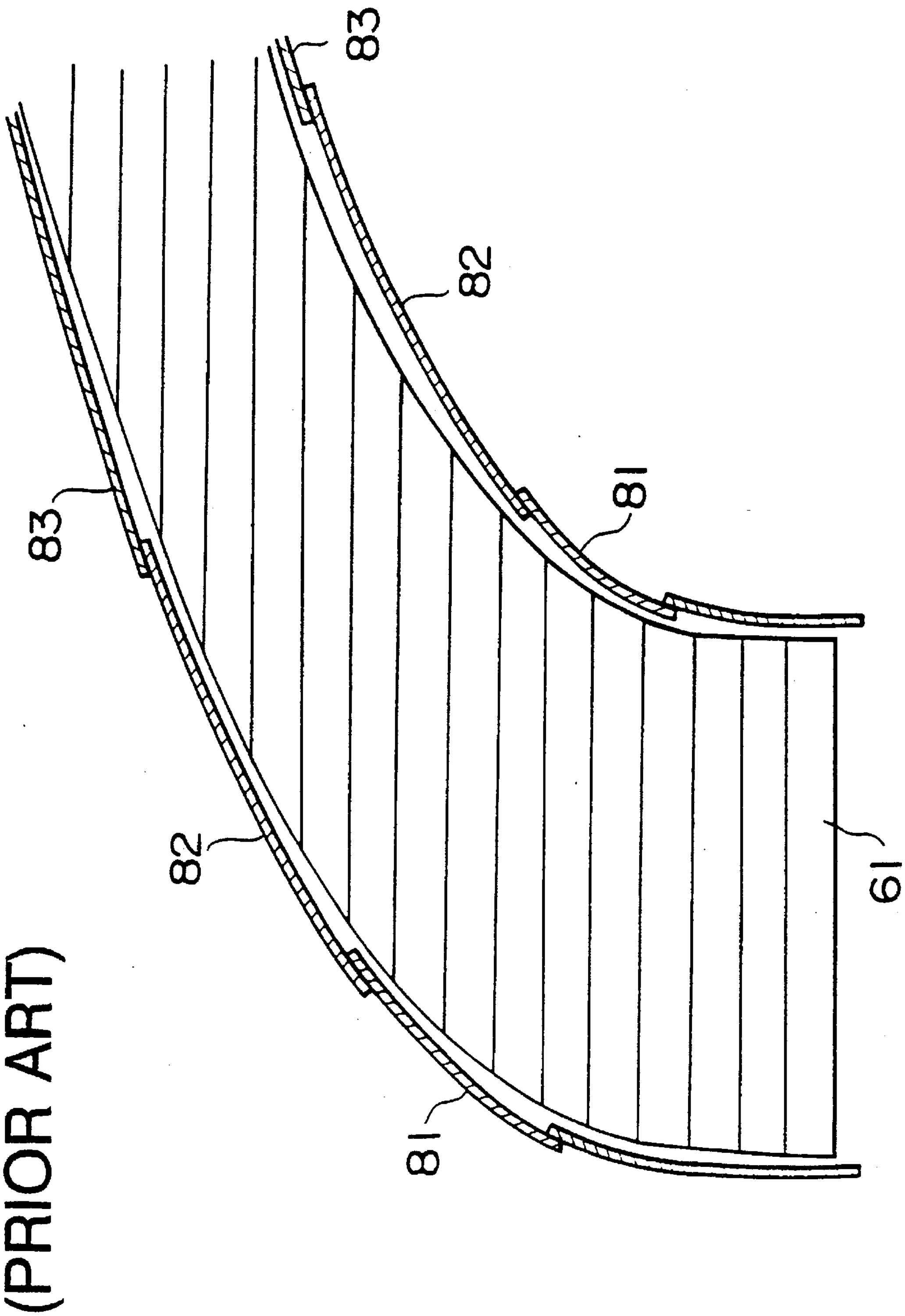
FIG. 28 (PRIOR ART)
FIG. 28 is a plan view showing a handrail system for a prior art speed variable moving sidewalk.

FIG. 19 is a side view of another configuration of a guiding plate at the joint portion. As an alternative for the aforementioned guiding plate 104, a small moving handrail or flat belt 109 is provided and driven at a speed close to those of the moving handrails before and after.

As has been detailed heretofore, by the arrangement of the handrails and the guiding plates provided therebetween, the safety for passengers can be improved in the following aspects as compared to the prior art mechanism in which handrail portions are overlapped with each other at their joint portions.

(1) Since the passenger and his or her hand move in the same direction, he or she does not get any uneasy feeling and his or her body does not come into contact with the ends of the moving handrail portions. Therefore ,the passenger can travel with a sense of security.

(2) The passenger's attention is called at the joint portion, but even if he or she fails to notice it, it is possible for the guiding plate to help the passenger's hand to transfer to the next moving handrails after leaving one moving handrail portion.

What is claimed is:

1. A speed variable moving sidewalk for conveying passengers on the upper face thereof, comprising:

an endlessly continuous circulating path extending longitudinally and vertically, comprising:

a pair of inverting sections which are disposed at opposite ends of the sidewalk and each composed of arced guide rails arranged within vertical planes, a high-speed section which is disposed at a center portion of the sidewalk and composed of horizontally extending and substantially straight guide rails, and a pair of speed variable sections which are each disposed between said inverting section and said high-speed section and composed of curving guide rails arranged within horizontal planes;

a large number of treadboards moving along said circulating path, said treadboards being inverted as proceeding vertically in said inverting sections, being transferred horizontally in a longitudinal direction in said high-speed section and being transversely slid right or left relative to neighboring treadboards in said speed variable sections so that said treadboards accelerate or retard to allow passengers to step onto or off from an upper face at end portions of the sidewalk;

a pair of driving chains for the inverting sections which each endlessly keep on circulating vertically and are disposed inside the guide rails in said respective inverting sections disposed at the end portions;

a pair of driving chains for the high-speed section each of which endlessly keeps on circulating vertically and are disposed inside the guide rails in opposite ends of said high-speed section;

a rack chain which is disposed inside the guide rails and outside said pair of driving chains for the high-speed section and endlessly continues to be circulated vertically across a whole part of said high-speed section by engaging said pair of driving chains for the high-speed section; and a pair of motors for line driving each of which is disposed at respective extremes of said circulating path and connected to closer one of said driving chains for the high-speed section through a line shaft with a reducing gear so as to drive a corresponding driving chain for the high-speed section at an appropriately reduced speed, wherein each treadboard is able to move independently of neighboring treadboards as being guided by said guide rails, and each of said treadboards comprises: hooks on an underside thereof which engage shafts of said driving chain for the inverting section in order to drive the treadboard at the inverting section; hooks on the underside thereof which engage shafts of said rack chain in order to drive the treadboard in the high-speed section; and a roller disposed in a portion being in contact with a neighboring treadboard in order to enable each treadboard to transversely slide relative to the neighboring treadboard.

2. A handrail mechanism for a speed variable moving sidewalk wherein a large number of treadboards are circularly moved along endless rails composed of vertical portions, and upper and lower portions each being made up of combination of a linear portion and curved portions within a horizontal plane and are transversely slid relative to one another in the upper and lower portions for acceleration or retardation thereof, comprising:

with a total length of said moving sidewalk being divided into plural portions, an independently moving handrail arranged for each of said divided plural portions of said sidewalk while said moving handrails are arranged without overlapping with one another, each of said moving handrails being driven at a speed close to a driving speed of nearby treadboards; and a plurality of guiding plates being disposed at jointing portions between adjoining moving handrails to thereby guide passenger's hands from one moving handrail to a next moving handrail.

3. A handrail mechanism for a speed variable moving sidewalk according to claim 2 wherein said moving handrails are provided on a surface thereof with comb-like grooves so as to be smoothly connected to said guiding plate.

4. A handrail mechanism for a speed variable moving sidewalk according to claim 2 wherein said guiding plate has freely rolling balls or rollers arranged thereon.

5. A handrail mechanism for a speed variable moving sidewalk according to claim 2 wherein, in order to inform passengers of existence of a guiding plate, one of an electric indicator, a sound/voice indicator, and an air-blowing device is provided on one of an upper face of said guiding plate and a vicinity of said guiding plate.

6. A handrail mechanism for a speed variable moving sidewalk wherein a large number of treadboards are circularly moved along endless rails composed of vertical portions, and upper and lower portions each being made up of combination of a linear portion and curved portions within a horizontal plane and are transversely slid relative to one another in the upper and lower portions for acceleration or retardation thereof, comprising:

with a total length of said moving sidewalk being divided into plural portions;

an independently moving handrail arranged for each of said divided plural portions of said sidewalk while said moving handrails are arranged without overlapping with one another, each of said moving handrails being driven at a speed close to a driving speed of nearby treadboards; and an endless belt positioned at jointing portions between adjoining moving handrails to thereby guide passenger's hands from one moving handrail to a next moving handrail, an upper face of said endless belt is driven in the same direction at an approximately identical speed as upper parts of the adjoining moving handrails move.

* * * * *